United States Patent
Jung et al.

(10) Patent No.: US 10,142,953 B2
(45) Date of Patent: Nov. 27, 2018

(54) METHOD AND APPARATUS FOR PERFORMING SYNCHRONOUS HARQ OPERATION ACCORDING TO VARIABLE TTI ALLOCATION

(71) Applicant: Electronics and Telecommunications Research Institute, Daejeon (KR)

(72) Inventors: Soojung Jung, Daejeon (KR); Anseok Lee, Daejeon (KR); Seungkwon Cho, Daejeon (KR); Sung Cheol Chang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 233 days.

(21) Appl. No.: 15/041,651

(22) Filed: Feb. 11, 2016

(65) Prior Publication Data

US 2016/0234800 A1 Aug. 11, 2016

(30) Foreign Application Priority Data

Feb. 11, 2015 (KR) .................. 10-2015-0020702
Jun. 8, 2015 (KR) .................. 10-2015-0080531
Feb. 2, 2016 (KR) .................. 10-2016-0013102

(51) Int. Cl.
*H04J 3/00* (2006.01)
*H04W 56/00* (2009.01)
*H04L 1/18* (2006.01)

(52) U.S. Cl.
CPC ......... *H04W 56/003* (2013.01); *H04L 1/1812* (2013.01)

(58) Field of Classification Search
CPC .................. H04W 56/003; H04L 1/1812
See application file for complete search history.

(56) References Cited

U.S. PATENT DOCUMENTS

| | | | |
|---|---|---|---|
| 8,448,036 | B2 | 5/2013 | Cai et al. |
| 2009/0259911 | A1 | 10/2009 | Tseng |
| 2010/0042884 | A1 | 2/2010 | Kuo et al. |
| 2010/0042888 | A1 | 2/2010 | Kuo |
| 2012/0082145 | A1* | 4/2012 | Chen ............... H04L 1/0029 370/338 |

(Continued)

FOREIGN PATENT DOCUMENTS

| | | |
|---|---|---|
| JP | 2010045790 A | 2/2010 |
| KR | 1020090109509 A | 10/2009 |
| KR | 1020100021388 A | 2/2010 |

OTHER PUBLICATIONS

"Technology-leading 5G R&D Status," 5G Open Symposium, 2015, pp. 17, 20.

*Primary Examiner* — Bo Hui A Zhu
(74) *Attorney, Agent, or Firm* — William Park & Associates Ltd.

(57) ABSTRACT

Provided are a method and an apparatus for performing a synchronous hybrid automatic repeat reQuest (HARQ). When a variable transmission time allocation is allocated per HARQ process, resource allocation information including a duration field corresponding to a length of a transmission time interval (TTI) allocated to each of the HARQ processes is transmitted. After the resource allocation information is transmitted, it is determined whether an HARQ error occurs at a predetermined timing and if it is determined whether the HARQ error occurs, the HARQ error is handled.

20 Claims, 17 Drawing Sheets

(56) References Cited

U.S. PATENT DOCUMENTS

2012/0155438 A1 6/2012 Shin et al.
2012/0294281 A1 11/2012 Park
2015/0312775 A1* 10/2015 Yi ........................ H04W 16/00
                                                                                  370/254

* cited by examiner

METHOD AND APPARATUS FOR PERFORMING SYNCHRONOUS HARQ OPERATION ACCORDING TO VARIABLE TTI ALLOCATION

CROSS-REFERENCE TO RELATED APPLICATION

This application claims priority to and the benefit of Korean Patent Application Nos. 10-2015-0020702, 10-2015-0080531, and 10-2016-0013102 filed in the Korean Intellectual Property Office on Feb. 11, 2015, Jun. 8, 2015, and Feb. 2, 2016, the entire contents of which are incorporated herein by reference.

BACKGROUND OF THE INVENTION (a) Field of the Invention

The present invention relates to a hybrid automatic repeat reQuest (HARQ), and more particularly, to a method and an apparatus for performing a synchronous HARQ operation.

(b) Description of the Related Art

In a long term evolution/LTE-advanced (LTE/LTE-A) system, user equipment suffers from an uplink coverage problem due to a short transmission time interval (TTI) and limited transmission power. In particular, when the user equipment is positioned at a cell edge, one Voice over Internet protocol (VoIP) packet may not be transmitted within one TTI (for example, subframe of LTE/LTE-A) due to the limited transmission power but may also be transmitted by radio link control (RLC) segmentation. Therefore, a transmission overhead may be increased and a VoIP service where short delays are stringent may lead to several problems.

Due to these problems, the existing LTE/LTE-A has introduced a TTI bundling scheme. In the TTI bundling applied to an uplink using the synchronous HARQ scheme, instead of segmenting the RLC SDU into smaller units at the RLC layer, one VoIP packet is configured one transport block (TB) and is transmitted in consecutive TTIs without waiting for the hybrid automatic repeat request (HARQ) feedback. After all transmission have been received and decoded by the base station in allocated TTIs, the HARQ feedback is sent.

When the user equipment hits the maximal transmission power, the TTI bundling operation can be activated with higher layer (RRC) signaling based on UE's report. The release of the TTI bundling operation is also controlled by the RRC signaling.

The TTI bundling in the LTE/LTE-A has the fixed bundling size and is applied to only the VoIP traffic. When considering performance requirement at the cell edge of the traffic having various data rates other than the VoIP and the transmission delay shorter than that of the existing LTE/LTE-A system, to decrease the overhead and the delay of the control signal while guaranteeing uplink coverage performance similar to the existing LTE/LTE-A, a scheme of variably allocating transmission time based on scheduling at MAC layer rather than TTI bundling by the RRC signaling is required.

Further, upon the operation of the synchronous HARQ of the LTE/LTE-A system, the HARQ process retransmitted from the receiver side is distinguished without a separate control signal according to the defined HARQ round trip time (RTT). However, assuming same HARQ processing time as the existing LTE/LTE-A, unlike the related art, when the variable transmission time is allocated per HARQ process, collisions between HARQ processes may occur during the retransmission if the allocated transmission times of HARQ process are different. Therefore, the number of retransmission of each HARQ process, etc., may vary according to the allocated transmission time of the HARQ processes. Therefore there is a need to change the synchronous HARQ operation of the existing LTE/LTE-A.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and an apparatus for processing a plurality of HARQ processes operated in a synchronous type belonging to user equipment and allocated with variable transmission time values without a separate control signal by a scheduler, when using a TTI shorter than before to support a short transmission delay of a wireless section in a wireless communication system.

An exemplary embodiment of the present invention provides a method for performing, a synchronous hybrid automatic repeat reQuest (HARQ), including: when a variable transmission time allocation is allocated per HARQ process, transmitting resource allocation information including a duration field corresponding to a length of a transmission time interval (TTI) allocated to each of the HARQ processes; determining whether an HARQ error occurs at predetermined timing after the resource allocation information is transmitted; and when the HARQ error occurs, handling the HARQ error.

The determining whether the HARQ error occurs may include: performing energy detection at a first receiving timing of an HARQ process newly allocated to the user equipment; and when the energy is not detected, determining that an HARQ error caused by reception error of the resource allocation information occurs.

The handling of the HARQ error may include: retransmitting the resource allocation information.

The handling of the HARQ error may further include: even after the resource allocation information is retransmitted, if the HARQ error caused by reception error of the resource allocation information occurs, performing readjusting of the HARQ round trip time (RTT) of the base station.

In the performing of the readjusting, the value of the HARQ RTT of the base station may be adjusted depending on a current HARQ RTT value of the user equipment.

The determining whether the HARQ error occurs may include: predicting, by a plurality of user equipment, whether the HARQ error caused by retransmission by a plurality of user equipment through same uplink resources occurs. The handling of the HARQ error may include: if it is predicted that the HARQ error occurs after previous transmission of user equipment, sending an positive acknowledgement (ACK) as HARQ feedback indicating a success of receiving the data to prevent the user equipment from retransmission.

The handling of the HARQ error may further include: sending the positive ACK as HARQ feedback and then re-allocating resources and transmitting information related to reallocated resources.

Another embodiment of the present invention provides a method for performing, by user equipment, a hybrid automatic repeat reQuest (HARQ), including: receiving resource allocation information from a base station and changing an HARQ RTT of a synchronous HARQ operation according to a duration field included in the resource allocation information, the duration field indicating a length of the TTI allocated to the HARQ process; and when the HARQ RTT is changed, transmitting an positive acknowledgement (ACK) for the resource allocation information to the base station.

The transmitting of the positive ACK to the base station may include: when data are received during multiple TTIs allocated to the user equipment, transmitting a positive ACK for downlink resource allocation information to the base station at a HARQ feedback (ACK/NACK (negative ACK)) transmission timing for first transmission among allocated multiple TTIs.

The transmitting of the ACK to the base station may include: transmitting the positive ACK for the uplink resource allocation information to the base station at first data transmission TTI among the multiple TTIs allocated to user equipment. An uplink control channel using for transmitting an ACK for the resource allocation information may be multiplexed with an uplink data channel.

The changing the HARQ RTT of the synchronous HARQ operation may include: calculating a new HARQ RTT depending on a value of the duration field; and if a value of the calculated new HARQ RTT is larger than a currently operating value of HARQ RTT, changing the HARQ RTT of the synchronous HARQ operation.

The method may further include: after operations of all user equipment's HARQ processes are ended, changing the HARQ RTT of the synchronous HARQ operation to a predetermined default value.

Yet another embodiment of the present invention provides an apparatus for performing, a hybrid automatic repeat reQuest (HARQ), including: a radio frequency converter transmitting/receiving a signal through an antenna; and a processor connected to the radio frequency converter and performing the HARQ, in which the processor may include: when transmission time with variable size is allocated per HARQ process, an allocation information transmitting processor transmitting resource allocation information including a duration field corresponding to a length of a transmission time interval (TTI) allocated to each of the HARQ processes; and after the resource allocation information is transmitted, a retransmission processor determining whether the HARQ error occurs at a predetermined timing and when the HARQ error occurs, handling the HARQ error.

When the energy is not detected at a first receiving timing of the user equipment's newly allocated HARQ process, the retransmission processor may determine that the HARQ error caused by reception error of the resource allocation information occurs and request the allocation information transmitting processor to retransmit the resource allocation information.

Even after the resource allocation information is retransmitted, if the HARQ error caused by reception error of the resource allocation information occurs, the retransmission processor may perform readjusting of the HARQ round trip time (RTT) of the base station.

The processor may further include: an HARQ feedback processor transmitting HARQ feedback for data transmitted through the uplink, and the retransmission processor may request the HARQ feedback processor to send positive acknowledgement (ACK) representing a success of receiving the data to the user equipment despite a failure of receiving data transmitted from the user equipment so that the user equipment does not retransmit data, if it is predicted that the HARQ error caused by retransmission by a plurality of user equipment through same uplink resources occurs.

Still another embodiment of the present invention provides an apparatus for performing, by user equipment, a hybrid automatic repeat reQuest (HARQ), including: a radio frequency converter transmitting/receiving a signal through an antenna; and a processor connected to the radio frequency converter and performing the HARQ, in which the processor may include: an allocation information receiving processor receiving resource allocation information from a base station; an RTT determination processor changing an HARQ RTT of a synchronous HARQ operation according to a duration field included in the resource allocation information, the duration field indicating a length of a TTI allocated to the HARQ process; and when the HARQ RTT is changed, an ACK processor transmitting an ACK for the resource allocation information to the base station.

The ACK processor may use one of a method for transmitting an ACK for the resource allocation information to the base station at an HARQ feedback (ACK/NACK (negative ACK))transmission timing for data reception of the first transmission among allocated multiple TTIs and a method for transmitting the ACK for the resource allocation information to the base station at the first data transmission TTI among multiple TTIs allocated for the data transmission.

The RTT determination processor may change the HARQ RTT of the synchronous HARQ operation when a value of the HARQ RTT newly calculated depending on the value included in the duration field is larger than the HARQ RTT value of the currently operating HARQ process.

DETAILED DESCRIPTION OF THE EMBODIMENTS

Figure 1:
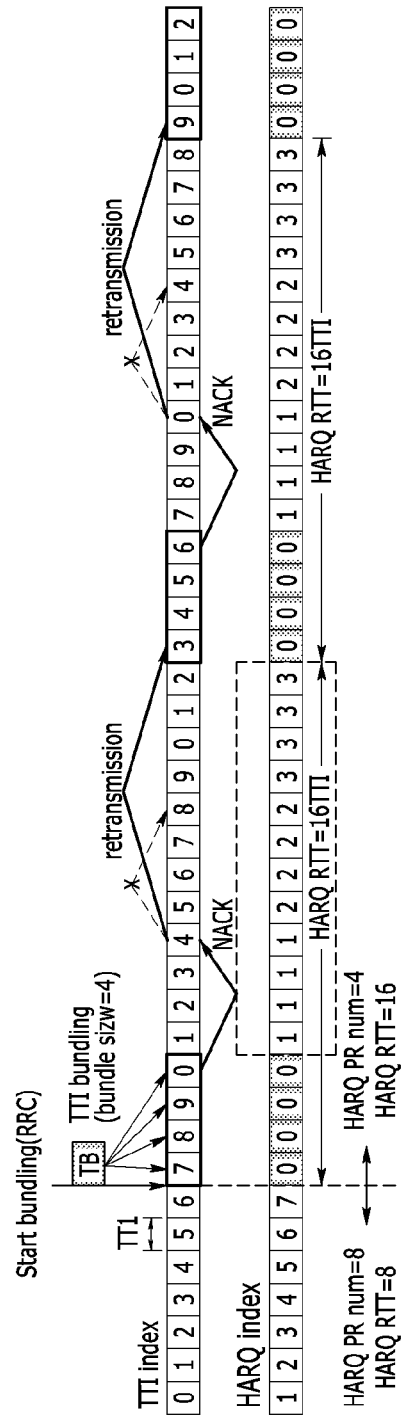
FIG. 1 is an exemplified diagram illustrating a TTI bundling operation.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the present specification, unless explicitly described to the contrary, "comprising" any components will be understood to imply the inclusion of other elements rather than the exclusion of any other elements.

In this specification, user equipment may designate a terminal, a mobile terminal (MT), a mobile station (MS), an advanced mobile station (AMS), a high reliability mobile station (HR-MS), a subscriber station (SS), a portable subscriber station (PSS), an access terminal (AT), etc., and may include the entire or partial functions of the MT, the MS, the AMS, the HR-MS, the SS, the PSS, the AT, the UE, etc.

A base station may designate an advanced base station (ABS), a high reliability base station (HR-BS), a node B (nodeB), an evolved node B (eNodeB), an access point (AP), a radio access station (RAS), a base transceiver station (BTS), a mobile multihop relay (MMR)-BS, a relay station (RS) serving as a base station, a relay node (RN) serving as a base station, an advanced relay station (HR-RS) serving as a base station, a high reliability relay station (HR-RS) serving as a base station, a small base station (a femto BS, a home node B (HNB), a home eNodeB (HeNB), a pico BS, a metro BS, a micro BS, etc.), etc., and may include all or some functions of the ABS, the nodeB, the eNodeB, the AP, the RAS, the BTS, the MMR-BS, the RS, the RN, the ARS, the HR-RS, the small base station, etc.

Hereinafter, a method and an apparatus for performing a synchronous hybrid automatic repeat request (HARQ) according to an exemplary embodiment of the present invention will be described with reference to the accompanying drawings.

FIG. 1 is an exemplified diagram illustrating a TTI bundling operation.

Upon the bundling of the transmission time interval (TTI), in an uplink in which the synchronized HARQ operation is used, one packet is not split but is processed in one PDU to be configured as one transport block (TB) and is continuously transmitted through a bundle of subsequent TTIs without HARQ feedback waiting time. The base station performs an HARQ feedback based on the synchronous HARQ operation and the HARQ feedback is transmitted based on a final TTI timing among the plurality of allocated TTIs In detail, when transmission power of user equipment reaches a limit, the user equipment reports the situation to a base station, and as a result the TTI bundling starts. As illustrated in FIG. 1, the base station instructs the user equipment through RRC signaling to perform the TTI bundling operation. Therefore, to support the synchronous HARQ operation of the uplink, the number of HARQ processes and an HARQ round trip time (RTT) are changed. That is, the HARQ operation of the user equipment is an operation of supporting 8 HARQ processes and the HARQ RTT of 8 TTIs and starts an operation of supporting 4 HARQ processes and an HARQ RTT of 16 TTIs or three HARQ processes and an HARQ RTT of 12 TTIs in FIG. 1. That is, in the existing LTE/LTE-A, a maximum of 8 HARQ processes of a stop and wait (SAW) scheme are operated in parallel, and as a result a synchronously operated HARQ RTT is operated as 8 TTIs. In this condition, if the TTI bundling is started by the RRC signaling, the HARQ RTT is operated as 16 TTIs while a maximum of 4 HARQ processes are operated, without a correlation with the existing HARQ operation. A release of the TTI bundling operation is also controlled by the RRC signaling.

HARQ process information retransmitted from a receiving side may be distinguished according to the HARQ RTT defined upon the operation of the synchronous HARQ, without a separate control signal. That is, in the LTE/LTE-A, by HARQ RTT=8, the HARQ process received at a current subframe #n corresponds to the same process as HARQ retransmitted at a subsequent subframe #n+8. Alternatively, in the TTI bundling, by HARQ RTT=16, the HARQ process received at a subframe #n to #n+3 corresponds to the same process as HARQ retransmitted at a subframe #n+16 to #n+19

This corresponds to the case where all the HARQ processes are assumed as being operated based on the TTI having the same length.

However, if the same HARQ related processing time as the existing LTE/LTE-A is assumed, unlike the related art, when a variable transmission time is allocated per the HARQ process, the transmission time for each HARQ process of the user equipment may be different.

Figure 2:
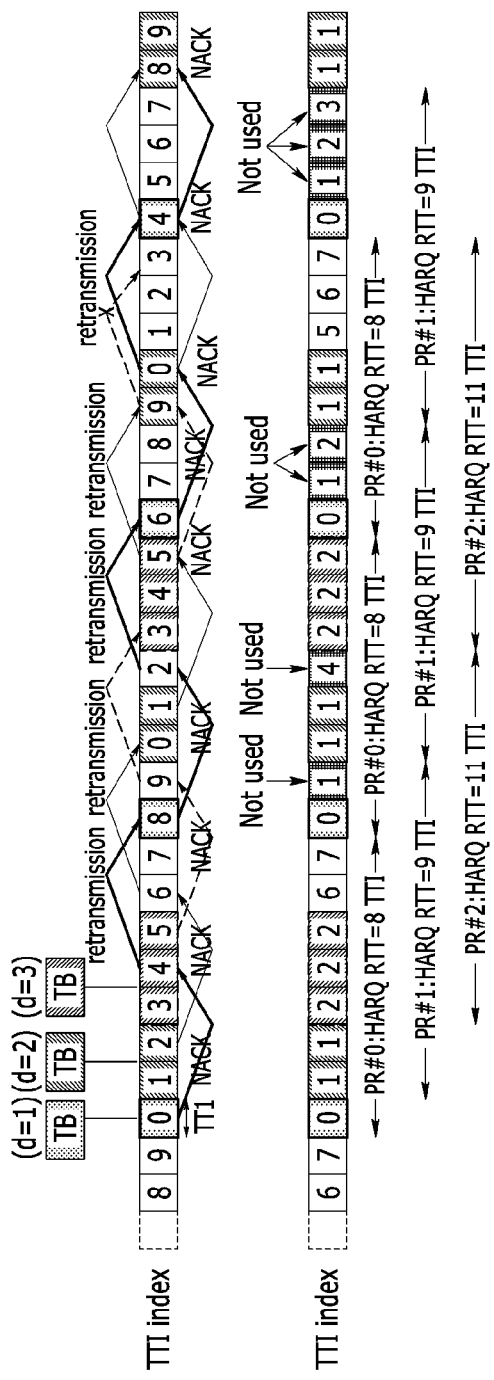
FIG. 2 is an exemplified diagram of a synchronous HARQ operation according to the existing scheme upon a variable TTI length allocation.

FIG. 2 is an exemplified diagram of a synchronous HARQ operation according to the existing scheme at the time of allocating a variable TTI length.

The transmission time allocated to the user equipment, that is, the size of the TTI may be variably allocated according to a channel condition and the user equipment may continuously transmit one TB like a TTI bundling scheme for the allocated TTIs. When the variable transmission time is allocated per the HARQ process, the transmission time for each HARQ process of the user equipment may be different. In this case, a collision may occur upon a retransmission between the HARQ processes, and as a result a retransmission frequency, etc., based on the transmission time for each process according to the configuration of the transmission time for the HARQ processes allocated to the user equipment may be variable. Therefore, there is a need to change the existing synchronous HARQ operation capable of confirming the HARQ processes according to each transmission timing (for example, TTI index) without the separate control signal at the receiving side.

According to an exemplary embodiment of the present invention, a duration field of predetermined bits is added to resource allocation information according to a scheduling operation.

The duration field consists of the predetermined bits, for example, L bits. To increase coverage and provide efficiency of resource allocation, an L value may be determined to represent a ratio of a duration having a maximum value to a minimum value that is supported in a system. The resource allocation information is included in a downlink (DL) allocation or an uplink (UL) grant.

To transmit one TB to a specific user equipment through one HARQ process by the scheduling operation of the base station, if the transmission TTI is allocated to the user equipment at a length of multiple times K of the minimum unit TTI, the HARQ RTT of the corresponding HARQ process of performing the synchronous HARQ operation is determined by the following Equation, for example, when the duration field is transmitted including information of "duration=k" through the resource allocation information.

$$HARQ\_RTT = (Num\_PR - 1) + duration \quad [\text{Equation 1}]$$

In the above Equation 1, Num_PR represents the number of HARQ processes for each user equipment and the duration represents the lengths of the TTIs allocated to each HARQ process. Here, $Num\_PR = N_{TTI_{eNBpro}} + N_{TTI_{UEpro}} + 2N_{TTI_{td}}$. $N_{TTI\_eNBpro}$ represents a processing time at a base station (eNB) represented in the minimum TTI unit, $N_{TTI\_UEpro}$ represents a processing time at user equipment (UE) represented in a minimum TTI unit, and $N_{TTI\_td}$ represents a transmittable minimum time represented in the minimum TTI unit.

After the fixed processing time (i.e., $N_{TTI\_eNBpro}/N_{TTI\_UEpro}$ (UL/DL) based on the final TTI of k TTIs allocated, when the fixed processing time elapses after a transmission of a positive acknowledgement (ACK)/negative ACK (NACK) at the receiving side and a reception of the ACK/NACK at the transmitting side, it is assumed that the transmitting side performs a retransmission.

The user equipment supports that one TB is transmitted by n frequencies for k TTIs allocated to the HARQ process (however, 1≤n≤k, for example, n=1 (this corresponds to one-time transmission) or n=k (this corresponds to a repetition transmission per each TTI)).

Figure 3:
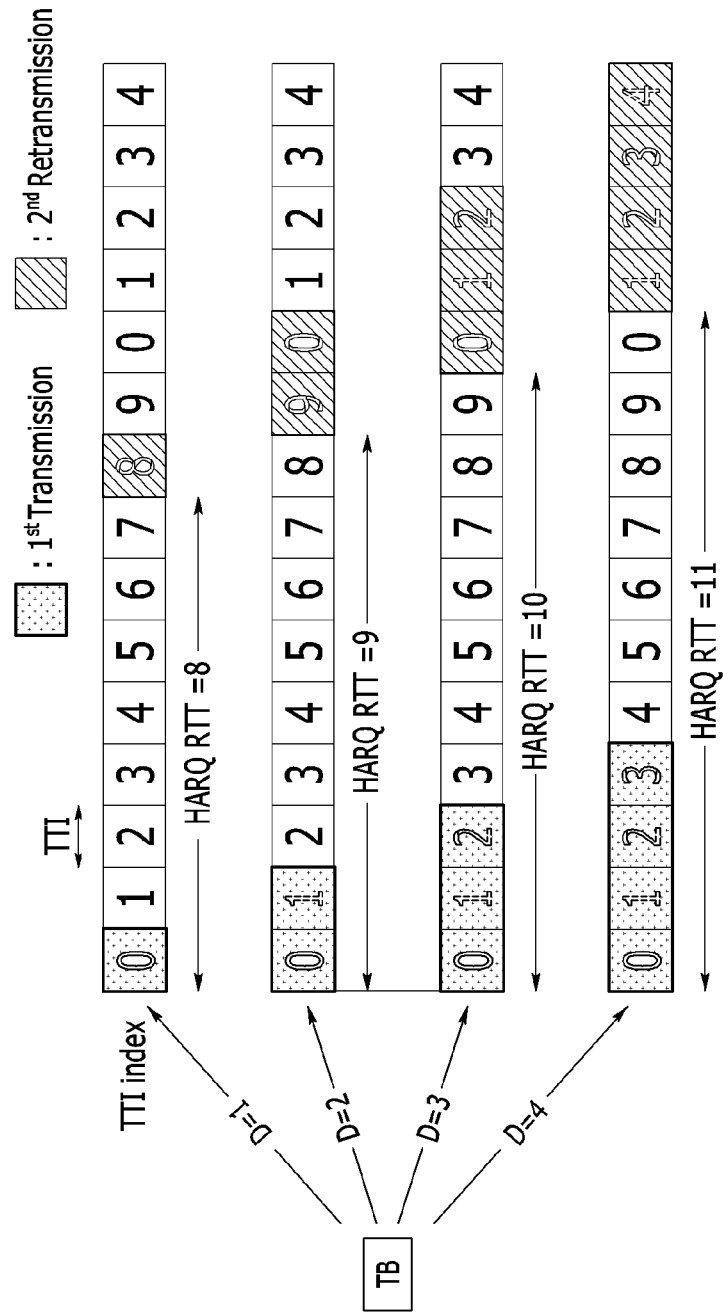
FIG. 3 is an exemplified diagram illustrating an HARQ RTT determination according to an exemplary embodiment of the present invention.

FIG. 3 is an exemplified diagram illustrating an HARQ RTT determination according to an exemplary embodiment of the present invention.

The HARQ RTT of the corresponding HARQ process of performing the synchronous HARQ operation is determined depending on the above Equation 1, for example, $N_{TTI\_UEpro}$ and $N_{TTI\_eNBpro}$ values are 3 and an $N_{TTI_{td}}$ value is 1 and if the maximum number of HARQ processes of the user equipment is 8 and the allocated TTI is allocated as a value 4 k=4 times larger than a minimum length, as illustrated in FIG. 2, the HARQ RTT of performing the synchronous HARQ operation is determined as 11. (That is, since duration=4 and Num_PR=8, HARQ RTT=11)

The user equipment and the base station determine the HARQ RTT to which the TB allocated to the corresponding process is allocated, for the HARQ processor newly allocated. In this case, the new HARQ RTT of the user equipment performing the synchronous HARQ operation is determined depending on the next Equation 2, based on the newly allocated duration.

$$HARQ\_RTT = \max(HARQ\_RTT\_cur, HARQ\_RTT\_new) \quad [\text{Equation 2}]$$

In the above Equation 2, HARQ_RTT_new represents the newly determined HARQ RTT depending on the newly allocated duration and HARQ_RTT_cur represents the HARQ RTT currently in use.

If the TTI value of the HARQ process newly allocated is larger than the TTI values of the currently active HARQ processes, the HARQ RTT of synchronous HARQ operation for the user equipment and the base station are increased according to the duration value. On the other hand, when the TTI value of the HARQ process newly allocated is smaller than the TTI values of the currently active HARQ processes, the HARQ RTT of the synchronous HARQ operation is not changed.

The base station transmits the HARQ process information newly allocated to the user equipment through a control channel (for example, physical downlink control channel (PDCCH)) to change the HARQ RTTs of the synchronous HARQ operation of the user equipment and the base station. The variable reliability of the HARQ RTT of the synchronous HARQ operation may be set to be the same as that of the control channel.

Figure 4:
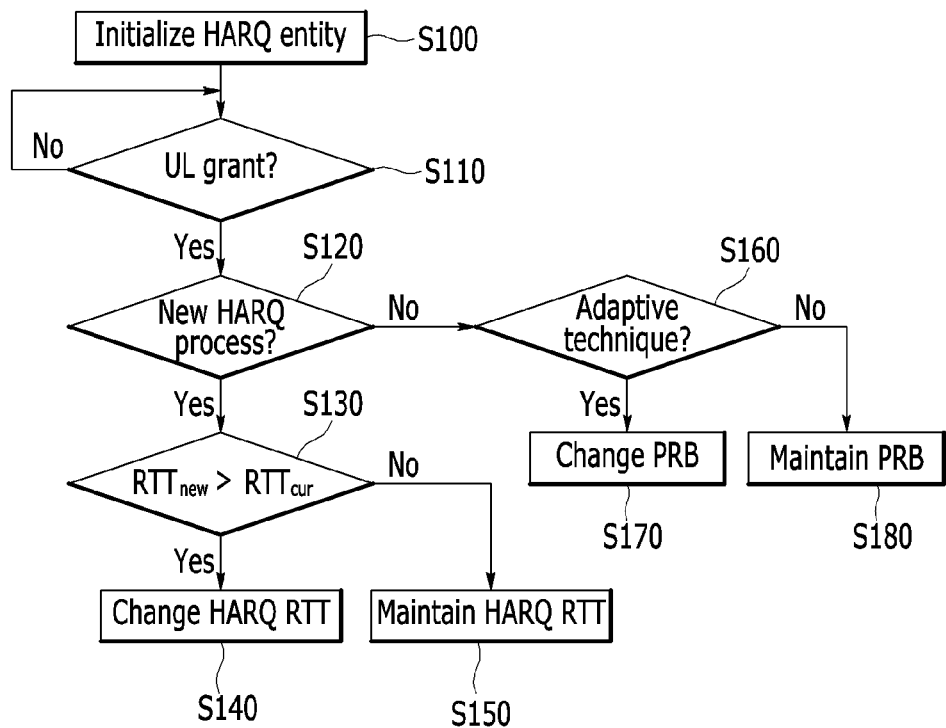
FIG. 4 is a flow chart illustrating a first example of an HARQ RTT determination procedure of a synchronous HARQ operation according to an exemplary embodiment of the present invention.

FIG. 4 is a flow chart illustrating a first example of an HARQ RTT determination procedure of a synchronous HARQ operation according to an exemplary embodiment of the present invention.

As illustrated in FIG. 4, the user equipment initializes an HARQ entity for performing the HARQ process (S100). The HARQ entity may continuously transmit data while waiting for feedback for successful or non-successful reception of a data transmission.

Next, the user equipment receives the resource allocation information (for example: UL grant for uplink data transmission) according to a scheduling operation through the control channel (for example, PDCCH) (S110) and if a new HARQ process is allocated (S120), compares an HARQ RTT newly determined according to the TTI duration of the newly allocated HARQ process with the HARQ RTT of the currently active HARQ process (S130). The user equipment may calculate the HARQ RTT newly determined depending on the above Equation 1 based on the duration field of the resource allocation information.

If the calculated HARQ RTT according to the TTI duration of the newly allocated HARQ process is larger than the HARQ RTTs of the currently active HARQ processes, the HARQ RTT of the synchronous HARQ operation is changed. That is, the HARQ RTT of the synchronous HARQ operation is changed to the HARQ RTT newly determined (S140).

On the other hand, if the calculated HARQ RTT according to the TTI duration of the newly allocated HARQ process is not larger than the HARQ RTTs of the currently active HARQ processes, the HARQ RTT of the synchronous HARQ operation maintains the value without being changed DeletedTexts.

Meanwhile, in the step S120, when the new HARQ process is not allocated, the currently allocated HARQ process is performed and when the allocated HARQ process, the amount and position of operates in an adaptive manner, resource (physical resource block (PRB)) are changed (S160 and S170). When the allocated HARQ process is operated in a non-adaptive manner, the amount and position of allocated resource PRB are fixed (S180).

As described above, if the HARQ RTT of the user equipment is determined and the transmissions of all HARQ processes is completed, the HARQ RTT of the synchronous HARQ operation may also be initialized as a default value defined in the system. As a result, the HARQ RTT may be represented as follows.

$$HARQ\_RTT = \begin{bmatrix} N(\text{default value}) & , (\text{if Num\_PR\_active} = 0) \\ \max(HARQ\_RTT\_cur, HARQ\_RTT\_new) & , (\text{if Num\_PR\_active} \neq 0) \end{bmatrix} \quad [\text{Equation 3}]$$

Figure 5:
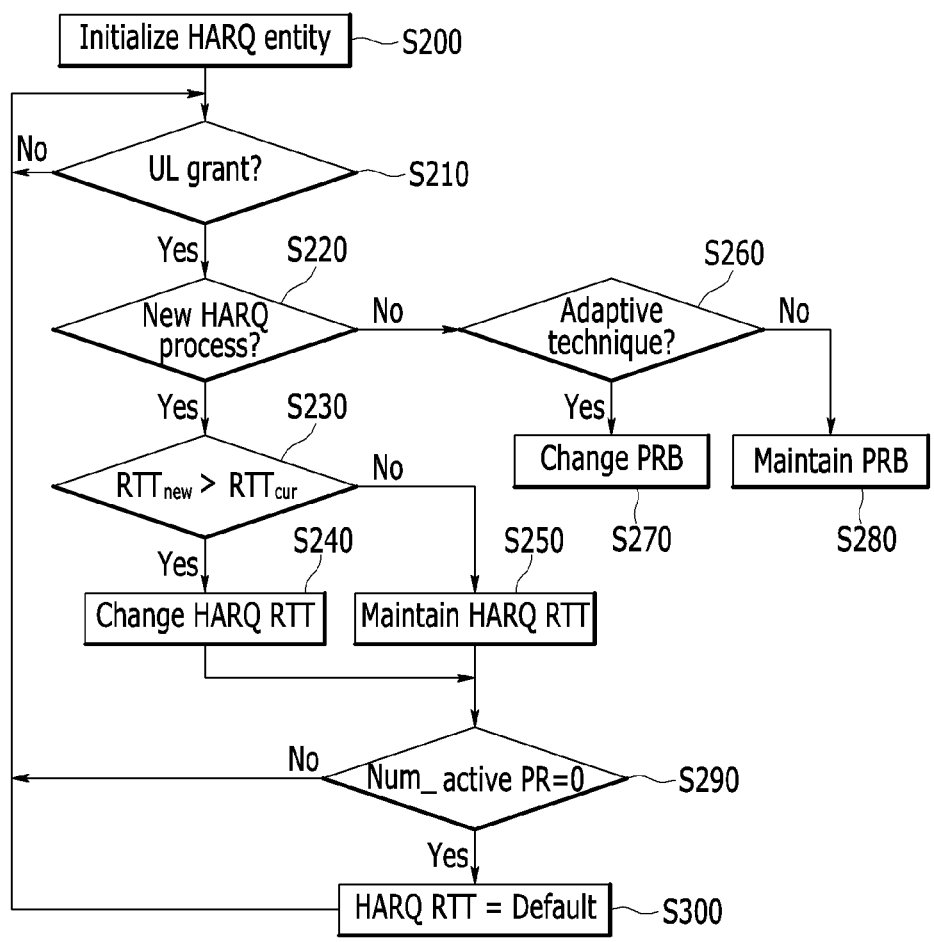
FIG. 5 is a flow chart illustrating a second example of an HARQ RTT determination procedure of a synchronous HARQ operation according to an exemplary embodiment of the present invention.

The procedure according to determination of the HARQ RTT is as illustrated in FIG. 5.

FIG. 5 is a flow chart illustrating a second example of an HARQ RTT determination procedure of a synchronous HARQ operation according to an exemplary embodiment of the present invention.

As illustrated in FIG. 5, the new HARQ process is allocated and as a result of comparing the HARQ RTT depending on the TTI duration of the newly allocated HARQ process with the HARQ RTTs of the currently active HARQ processes, the HARQ RTT of the synchronous HARQ operation is changed or maintained (S200 to S250), the HARQ processes are performed depending on the determined HARQ RTT.

If the performance of all the HARQ processes is completed, that is, if the number of activated HARQ processes is 0 (Num_PR_active=0) (S290), the HARQ RTT of the synchronous HARQ operation is defined as the default value defined in the system (S300).

According to the determination method of FIG. 4, the HARQ RTT of the synchronous HARQ operation is remained a maximum duration value after the initial state, while according to the determination method of FIG. 5, the HARQ RTT of the synchronous HARQ operation is changed to various values depending on the scheduling.

When the HARQ RTT of the synchronous HARQ operation is determined according to the determination method of FIG. 5, to handle the HARQ related error operation caused by the reception error of the control channel through which the resource allocation information is transmitted, the receiving side performs an error checking procedure.

According to an exemplary embodiment of the present invention, the HARQ related error such as an HARQ RTT mismatch that the HARQ RTT value of the base station and the HARQ RTT value of the user equipment are different from each other may occur. The HARQ related error that may occur due to the reception error of the resource allocation information is divided into the case in which the HARQ RTT is increased and the case in which the HARQ RTT is reduced. The case in which the HARQ RTT is increased or reduced is again divided into the case in which the allocation of the new HARQ process is continuously made since the reception error and the case in which the allocation of the new HARQ process is not made since the reception error. In the case of each of the error occurrences, the error checking and the error handling are performed by an energy detection scheme at the transmission timings determined for each HARQ process at the receiving side.

The energy detection scheme is performed by measuring received signal intensity. For example, the base station performs the measurement of the signal intensity received through the data resource allocated to the user equipment at the predicted transmission timing of the user equipment and determines that the HARQ RTT of the synchronous HARQ operation is not changed when the received signal intensity measured is equal to or less than a predetermined threshold. On the other hand, when the received signal intensity measured is larger than the predetermined threshold, it is determined that the HARQ RTT of the synchronous HARQ operation is changed.

After the resource allocation information is transmitted, if it is determined that the HARQ RTT of the synchronous HARQ operation is not changed, it is determined that the HARQ error occurs due to the reception error of the resource allocation information and the HARQ error handling procedure is performed as follows.

Figure 6:
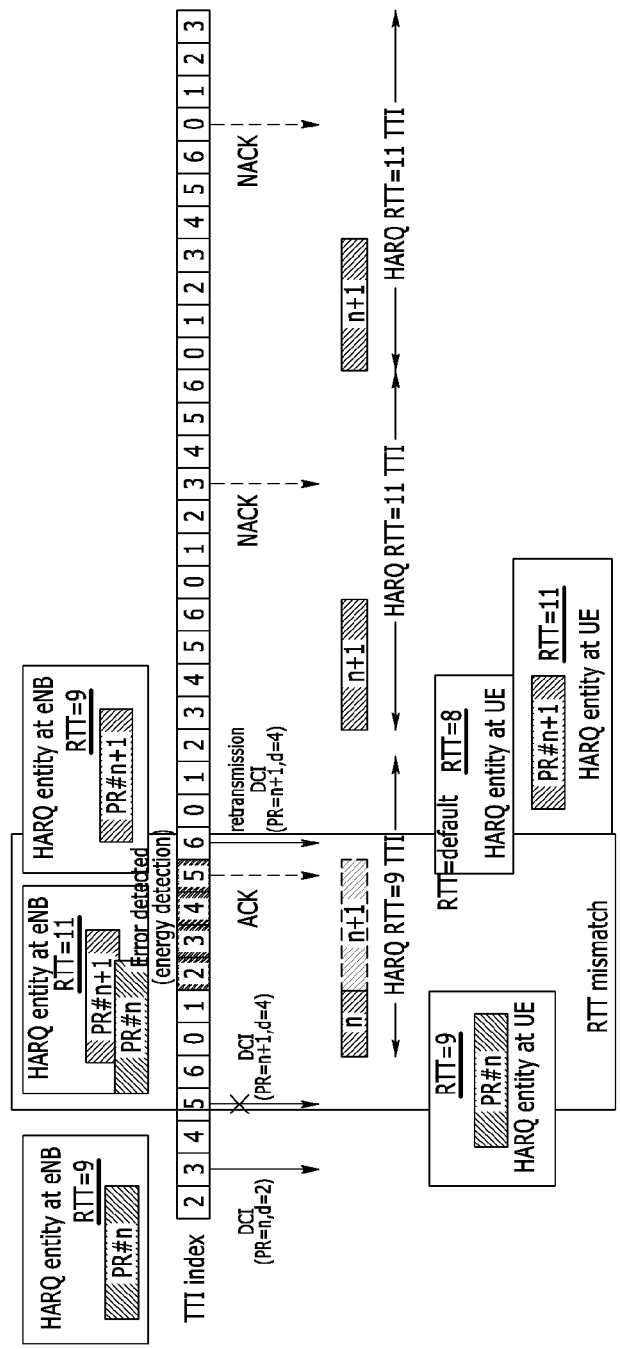
FIG. 6 is an exemplified diagram illustrating an HARQ error handling procedure due to a reception error of resource allocation information according to a first exemplary embodiment of the present invention and FIG. 7 is a flow chart illustrating the HARQ error handling procedure according to the first exemplary embodiment of the present invention.
Figure 7:
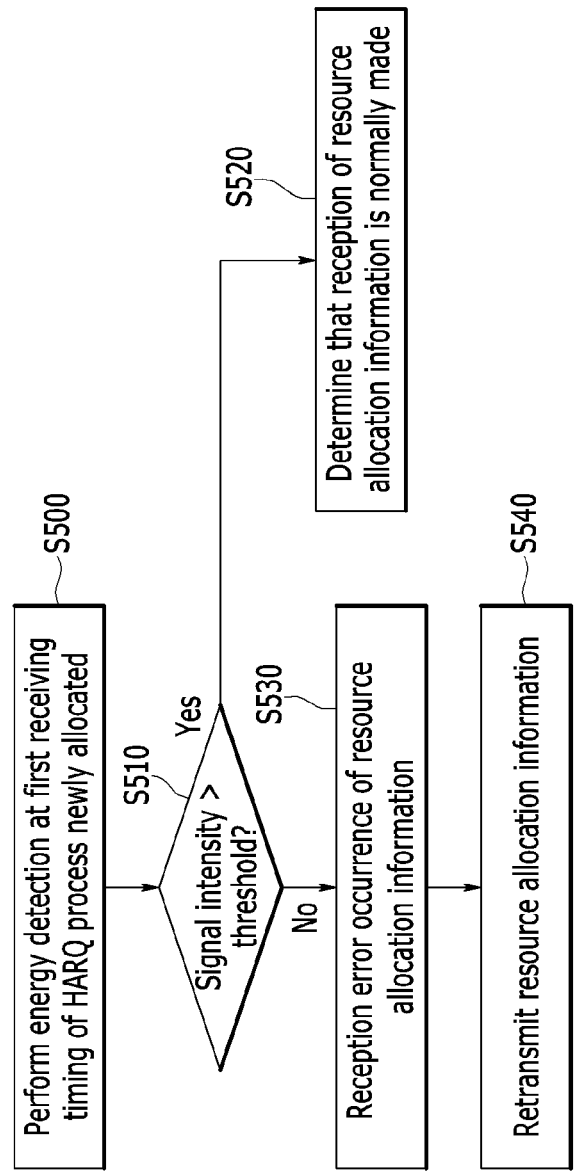

FIG. 6 is an exemplified diagram illustrating an HARQ error handling procedure due to a reception error of resource allocation information according to a first exemplary embodiment of the present invention and FIG. 7 is a flow chart of an HARQ method for handling an HARQ error due to a reception error of resource allocation information according to the first exemplary embodiment of the present invention.

When the HARQ RTTs of the synchronous HARQ operation of each user equipment are determined by FIG. 5, the resource allocation information for newly allocated HARQ process in the uplink includes the TTI duration of the new HARQ process so that the synchronous HARQ of the user equipment is operated according to the RTT value larger than the current RTT of the active HARQ and when the reception error of the resource allocation information occurs, a scheme of handling an error is illustrated in FIG. 6.

To handle the error, as illustrated in FIG. 7, the base station performs the energy detection before the TB decoding is performed at the first receiving timing of the HARQ process newly allocated (S500). It is confirmed whether the TB is received by the energy detection (S510). If the received signal intensity is larger than the threshold, it may be determined that the TB is received (S520) and if the received signal intensity is equal to or less than the threshold, it may be determined that the TB is not received (S530).

When the TB is not received at a first receiving timing of the HARQ process newly allocated, the base station determines that the mismatch of the HARQ RTT occurs and retransmits the resource allocation information for the corresponding HARQ process (S540). The above-mentioned procedure is repeatedly performed within the defined retransmission frequency until the TB is received at the first receiving timing of the corresponding HARQ process.

Figure 8:
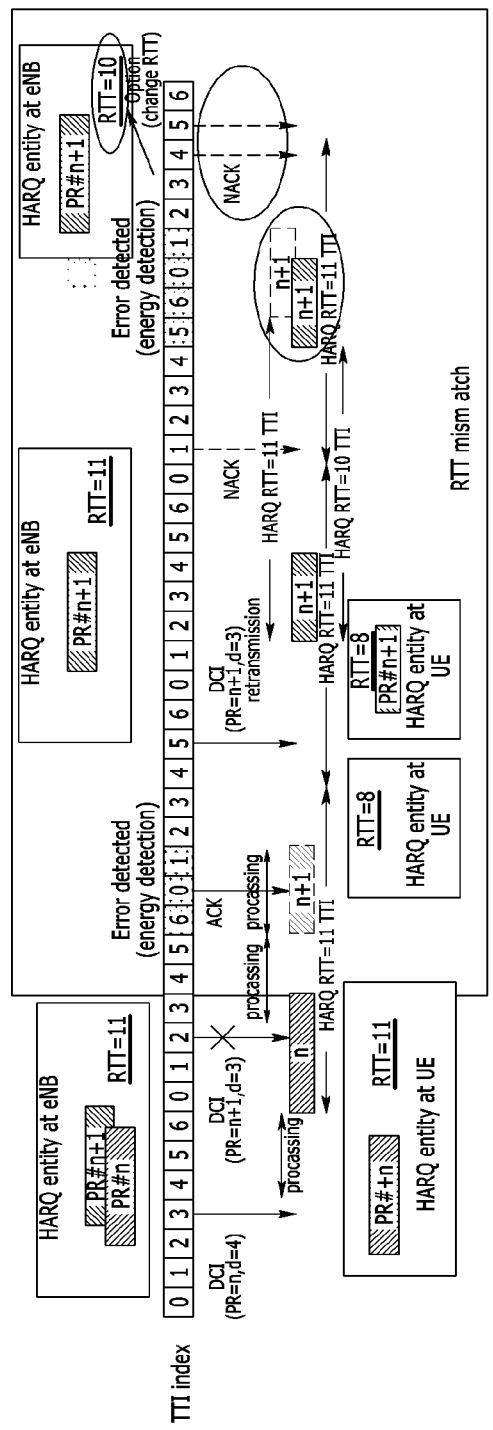
FIG. 8 is an exemplified diagram illustrating an HARQ error handling procedure due to a reception error of resource allocation information according to a second exemplary embodiment of the present invention.
Figure 9:
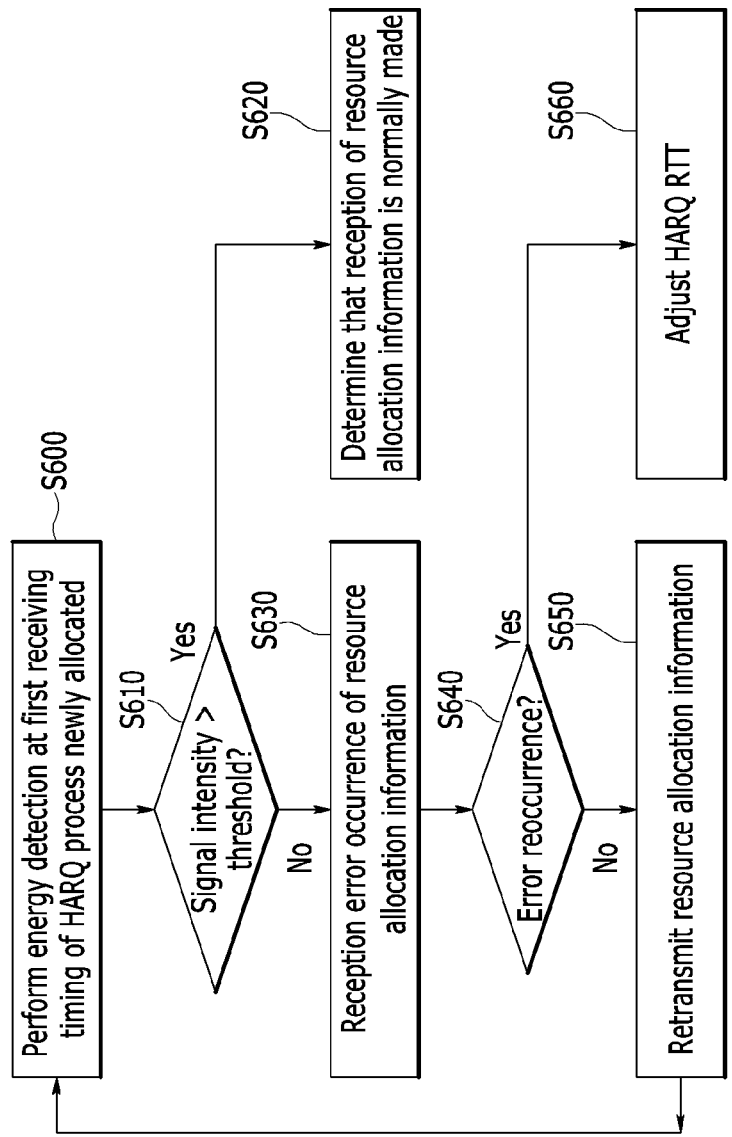
FIG. 9 is a flow chart of an HARQ method for handling an HARQ error due to a reception error of resource allocation information according to the second exemplary embodiment of the present invention.

FIG. 8 is an exemplified diagram illustrating an HARQ error handling procedure due to a reception error of resource allocation information according to a second exemplary embodiment of the present invention and FIG. 9 is a flow chart of an HARQ method for handling an HARQ error due to a reception error of resource allocation information according to the second exemplary embodiment of the present invention.

When the HARQ RTTs of the synchronous HARQ operation of each user equipment are determined as illustrated in FIG. 5, the resource allocation information for newly allocated the HARQ process in the uplink includes the TTI duration of the new HARQ process having a value smaller than the RTTs of the currently active HARQ processes and when the reception error of the resource allocation information occurs, a scheme of handling an error is illustrated in FIG. 8. Like the case in which the HARQ RTT is increased, the HARQ RTT mismatch that the HARQ RTT values of the base station and the user equipment are different from each other may occur.

To handle the error, as illustrated in FIG. 9, the base station performs the energy detection at the first receiving timing of the HARQ process newly allocated like the first exemplary embodiment of the present invention and if it is determined that the TB is not received at the first receiving timing of the HARQ process newly allocated based on the energy detection result (S630), determines that the HARQ RTT mismatch occurs and retransmits the resource allocation information for the corresponding HARQ process (S640 and S650).

FIG. 8 corresponds to the case in which as described with reference to FIG. 5, the user equipment completes all the activated HARQ process operations and the HARQ RTT is changed to the default value. In this case, even after the resource allocation information is retransmitted, the HARQ RTT mismatch is again detected by the energy detection scheme at the first receiving timing. In this case, the base station performs the readjustment of the HARQ RTT depending on the current HARQ RTT value that is being operated by the user equipment to handle the HARQ RTT mismatch (S640 and S660).

Figure 10:
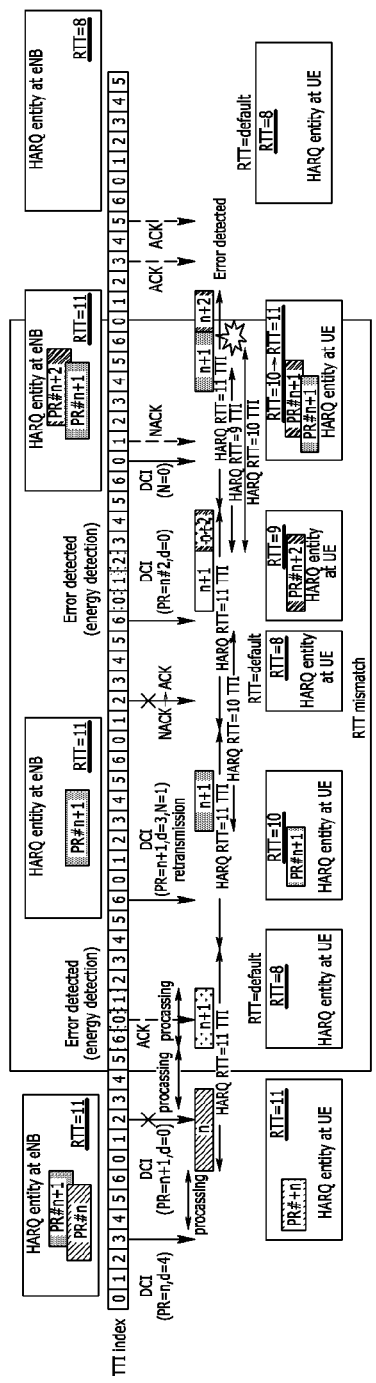
FIG. 10 is an exemplified diagram illustrating an HARQ error handling procedure due to a reception error of resource allocation information according to a third exemplary embodiment of the present invention.

FIG. 10 is an exemplified diagram illustrating an HARQ error handling procedure due to a reception error of resource allocation information according to a third exemplary embodiment of the present invention. The third exemplary embodiment of the present invention performs a procedure of handling an HARQ error by the same method as the second exemplary embodiment of the present invention.

When the HARQ RTTs of the synchronous HARQ operation of each user equipment are determined as illustrated in FIG. 5, the resource allocation information for newly allocated e HARQ process in the uplink includes the TTI duration of the new HARQ process having a value smaller than the RTTs of the currently active HARQ processes and when the reception error of the resource allocation information occurs, a scheme of handling an error is illustrated in FIG. 10.

Unlike the second exemplary embodiment of the present invention as described above, the third exemplary embodiment of the present invention as illustrated in FIG. 9 handles the error when the new resource allocation information is retransmitted after the reception error of the resource allocation information.

As described above, the base station performs the energy detection prior to the TB decoding at the first receiving timing of the HARQ process newly allocated and retransmits resource allocation information later. If it is determined that the transmission timing error between the processes occurs in retransmitted resource allocation information and therefore the HARQ RTT mismatch occurs, the base station adjusts the HARQ RTT to handle the HARQ RTT mismatch. Even in this case, the base station may perform the readjustment of the HARQ RTT depending on the current HARQ RTT value that is being operated by the user equipment to handle the error.

As described above, when the HARQ RTT of the synchronous HARQ operation is variably changed depending on the information of the HARQ process newly allocated, the retransmission resources non-adaptively allocated between the terminals may collide with each other.

Figure 11:
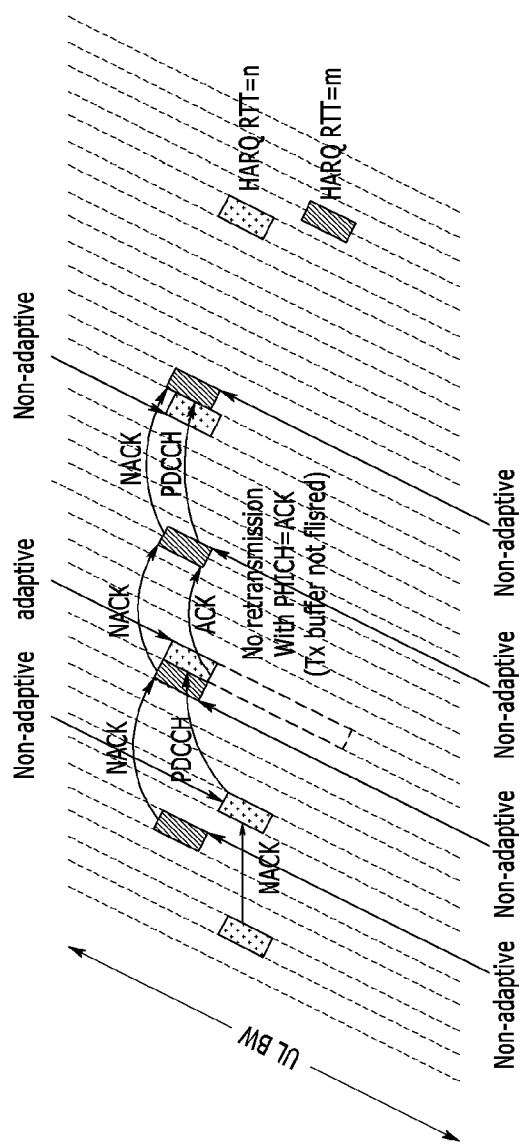
FIG. 11 is an exemplified diagram illustrating an HARQ error handling procedure due to a collision of retransmission resources use according to a fourth exemplary embodiment of the present invention.
Figure 12:
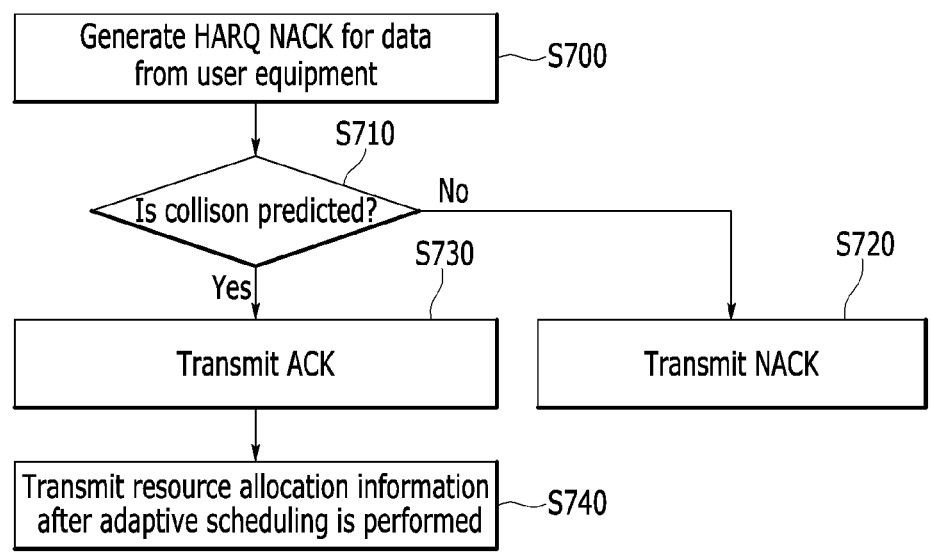
FIG. 12 is a flow chart of an HARQ method for handling the HARQ error due to the collision of retransmission resources use according to the fourth exemplary embodiment of the present invention.

FIG. 11 is an exemplified diagram illustrating an HARQ error handling procedure due to a collision of retransmission resources use according to a fourth exemplary embodiment of the present invention. FIG. 12 is a flow chart of an HARQ method for handling the HARQ error due to the collision of retransmission resources use according to the fourth exemplary embodiment of the present invention.

When the variable HARQ RTT determination is made, if it is predicted that a collision occurs between resources through which a plurality of the user equipment retransmit uplink data, as illustrated in FIG. 11, the base station transmits HARQ feedback information for data transmitted from the user equipment as ACK instead of NACK to prevent the retransmission predicted to collide from occurring.

In detail, as illustrated in FIG. 12, when the base station is in the situation in which the decoding for the data transmitted from the user equipment fails and thus the NACK needs to be transmitted (S700), if the user equipment retransmits data later according to the NACK feedback, the base station determines whether the collision due to the retransmission of other user equipment occurs (S710). If it is determined that upon the retransmission, the collision due to the retransmission of other user equipment does not occur, the base station transmits the NACK to perform the data retransmission of the user equipment (S720).

On the other hand, if it is determined that upon the retransmission, the collision due to the retransmission of other user equipment occurs, the base station performs the HARQ feedback transmitting the ACK instead of the NACK (S730). The user equipment does not retransmit data according to the HARQ feedback of the ACK. Further, the base station adaptively performs the scheduling at the next retransmission timing and transmits the resource allocation information to the user equipment accordingly (S740). Therefore, the user equipment retransmits data through the resources newly allocated.

Since the received data are stored in the buffer during the retransmission of the HARQ process, as described above, the base station may send the ACK feedback for data to be retransmitted and then transmit the resource allocation information for the data retransmission to the user equipment. In this case, the position of the resource for the data retransmission may not be changed.

Further, when the collision in the resource use with the existing other user equipment that are being operated synchronously and non-adaptively is predicted due to the change of the HARQ RTT, the user equipment in which the HARQ RTT of the synchronous HARQ operation is changed adaptively may be reallocated the resource for retransmission after the ACK transmission to solve the collision in the resource use with the existing other user equipment that are being synchronously and non-adaptively operated.

Meanwhile, when the HARQ RTT of the synchronous HARQ operation is determined by the scheme illustrated in FIG. 4 or 5, to prevent the HARQ related error operation (for example, HARQ RTT mismatch between the base station and the user equipment) that may occur due to the reception error of the control channel (for example, PDCCH) through which the resource allocation information is transmitted, the receiving confirmation procedure of the resource allocation information by the user equipment may also be added.

Figure 13:
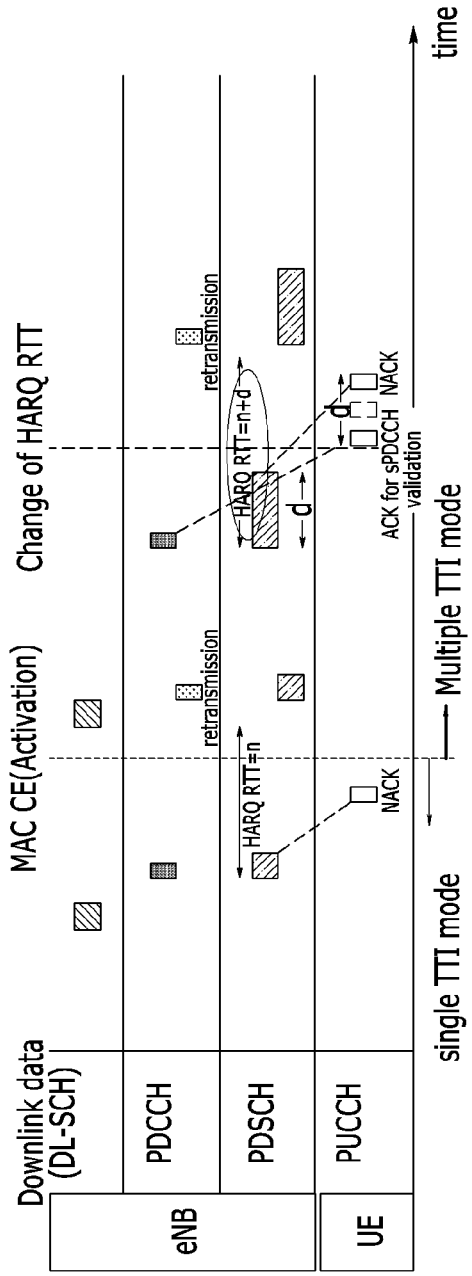
FIG. 13 is an exemplified diagram illustrating an HARQ error handling procedure due to a reception error of resource allocation information according to a fifth exemplary embodiment of the present invention and FIG. 14 is a flow chart of the HARQ method according to a fifth exemplary embodiment of the present invention.
Figure 14:
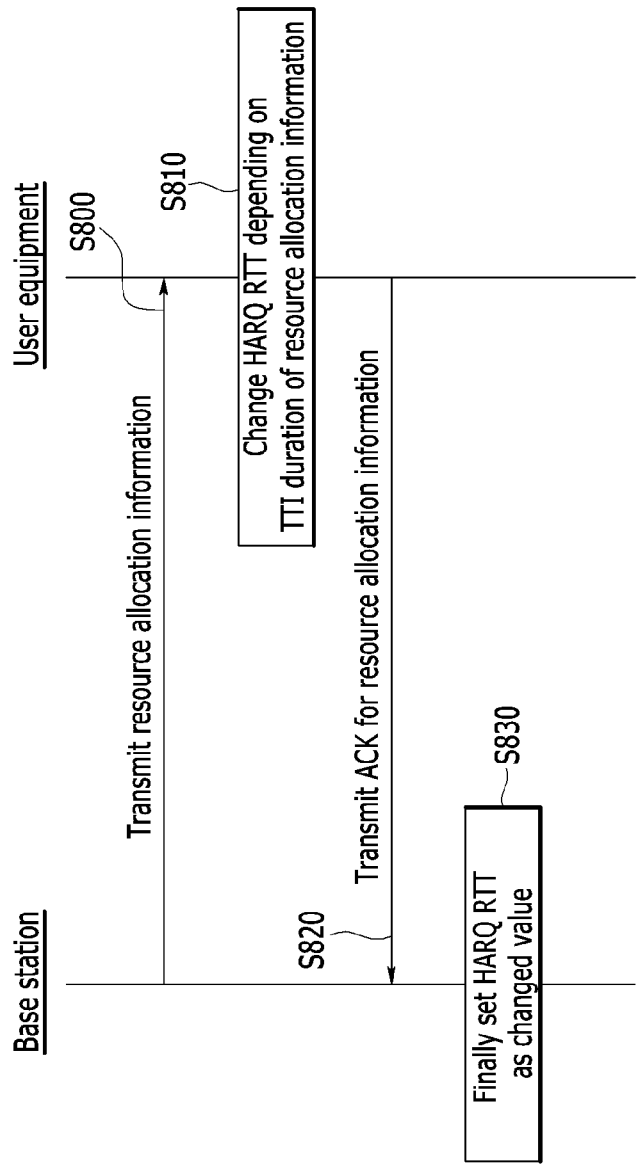

FIG. 13 is an exemplified diagram illustrating an HARQ error handling procedure due to a reception error of resource allocation information according to a fifth exemplary embodiment of the present invention and FIG. 14 is a flow chart of the HARQ method according to a fifth exemplary embodiment of the present invention.

When the HARQ RTT is changed according to the TTI duration within the resource allocation information received from the base station, as illustrated in FIG. 13, the user equipment transmits ACK for the corresponding resource allocation information through the channel through which the HARQ feedback information is transmitted. The procedure may start when adding the duration field corresponding to an L bit to the resource allocation information from the base station is set at the user equipment side through signaling (RRC signaling or MAC control element (CE)) at an upper layer.

When adding the duration field to the resource allocation information is set, as illustrated in FIG. 14, the base station transmits the resource allocation information (S800) and the user equipment additionally confirms the duration field within the received resource allocation information and changes the HARQ RTT of synchronous HARQ operation depending on the predetermined value of the duration field as described above (S810).

When the HARQ RTT of synchronous HARQ operation is changed, the user equipment transmits the ACK for the resource allocation information received through the control channel to the base station (S820). In detail, the user equipment may transmit the ACK for the resource allocation information to the base station through the uplink control channel (for example, physical uplink control channel (PUCCH)) at the HARQ ACK/NACK transmission timing for the data reception of the first transmission among the allocated multiple TTIs, that is, at the HARQ ACK/NACK transmission timing for the data reception of the first TTI of the TTI duration allocated to the user equipment.

When receiving the ACK for the resource allocation information from the user equipment, the base station finally set HARQ RTT of synchronous HARQ operation as the changed value (S830). That is, the base station sets the HARQ RTT of synchronous HARQ operation as a value corresponding to the set value of the duration field which is transmitted included in the resource allocation information. By the process, the HARQ RTT mismatch between the base station and the user equipment may be prevented.

In particular, as illustrated in FIG. 13, when the base station is set (for example, multiple TTI mode) to allocate a plurality of TTIs through one resource allocation information in the user equipment, the user equipment may confirm the duration field of the resource allocation information later received through the control channel (for example, PDCCH) and perform the change in the HARQ RTT of synchronous HARQ operation depending on the value of the duration field. When the HARQ RTT of synchronous HARQ operation is changed, the user equipment transmits the ACK for the resource allocation information at the HARQ ACK/NACK transmission timing for the data reception of the first TTI among the multiple TTIs allocated through the uplink control channel (for example, physical uplink control channel (PUCCH)). In this case, the HARQ ACK/NACK for the data received by the user equipment for the allocated TTI duration is transmitted only once through the uplink control channel by the user equipment at the transmission timing of the ACK/NACK for the data reception of the final TTI of the allocated duration.

Figure 15:
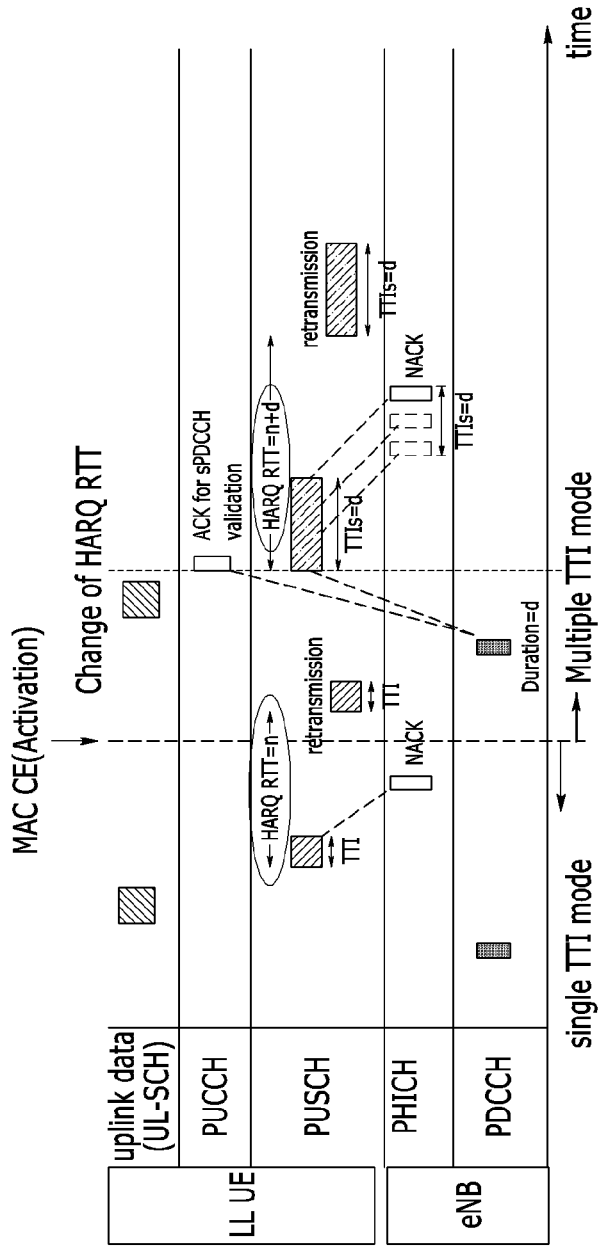
FIG. 15 is an exemplified diagram illustrating an HARQ error handling procedure due to a reception error of resource allocation information according to a sixth exemplary embodiment of the present invention.

FIG. 15 is an exemplified diagram illustrating an HARQ error handling procedure due to a reception error of resource allocation information according to a sixth exemplary embodiment of the present invention. According to the sixth exemplary embodiment of the present invention, the procedure for handling an HARQ error is performed by the same method as the fifth exemplary embodiment of the present invention and the fifth exemplary embodiment of the present invention and the sixth exemplary embodiment of the present invention are different from each other in that the fifth exemplary embodiment illustrates a downlink and the sixth exemplary embodiment allows the user equipment to transmit the ACK for the uplink resource allocation information.

As the fifth exemplary embodiment described above, when the base station is set (for example, multiple TTI mode) to allocate a plurality of TTIs through one resource allocation information in the user equipment, the user equipment may confirm the duration field of the resource allocation information later received through the control channel (for example, PDCCH) and perform the change in the HARQ RTT of synchronous HARQ operation depending on the value of the duration field.

When the HARQ RTT of synchronous HARQ operation is changed, the user equipment transmits the ACK for the resource allocation information received through the control channel to the base station. In detail, as illustrated in FIG. 15, the user equipment transmits the ACK for the resource allocation information through the uplink control channel the first data transmission TTI among the multiple TTIs, that is, at the data transmission timing of the first TTI of the allocated TTI duration for the uplink data transmission. In this case, the uplink control channel through which the ACK for the resource allocation information is transmitted may be transmitted while being multiplexed with the uplink data channel (for example, physical uplink shared channel (PUSCH)) transmitted by the user equipment.

The base station performs the HARQ ACK/NACK for the uplink data. In this case, the base station transmits the HARQ ACK/NACK only once through a downlink control channel (that is, physical hybrid ARQ indicator channel (PHICH)) at the transmission timing of the ACK/NACK for the final TTI of the allocated duration.

Figure 16:
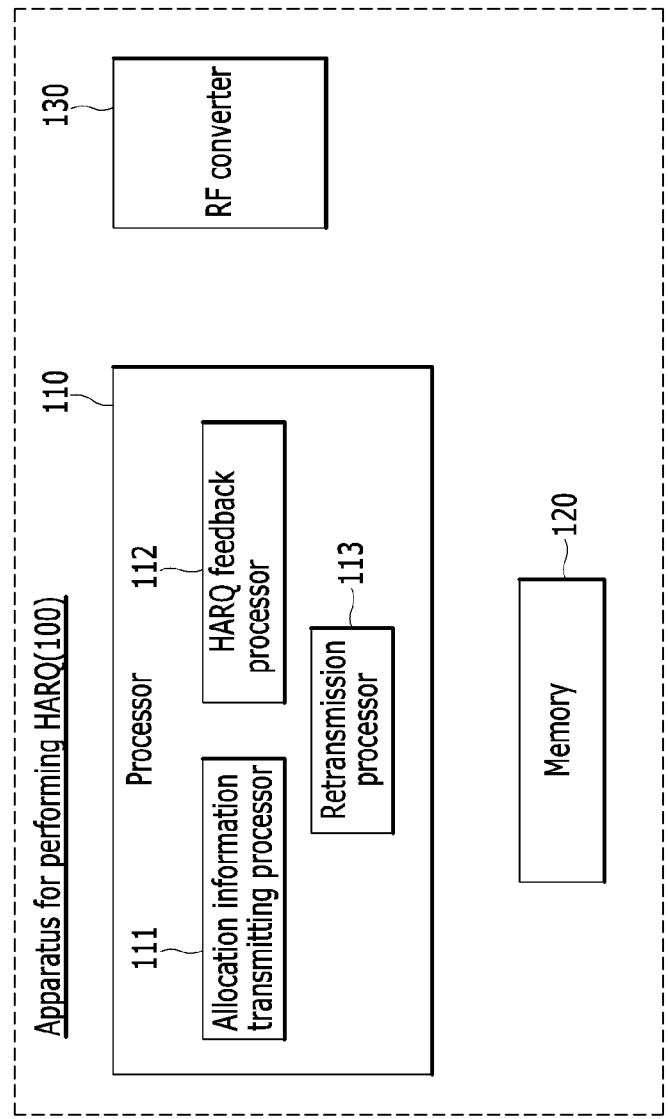
FIG. 16 is a configuration diagram of an apparatus for performing HARQ of a base station according to an exemplary embodiment of the present invention.

FIG. 16 is a configuration diagram of an apparatus for performing HARQ of a base station according to an exemplary embodiment of the present invention.

As illustrated in FIG. 16, an apparatus 100 for performing an HARQ of the base station according to the exemplary embodiment of the present invention includes a processor 110, a memory 120, and a radio frequency (RF) converter 130. The processor 110 may be configured to implement the method described based on FIGS. 2 to 15. Here, the detailed description of a portion similar to the above method will be omitted.

For this purpose, the processor 110 includes an allocation information transmission processor 111, an HARQ feedback processor 112, and a retransmission processor 113.

The allocation information transmission processor 111 transmits the resource allocation information depending on the scheduling. The resource allocation information includes the duration field including the value corresponding to the TTI duration for the HARQ process of the user equipment.

The HARQ feedback processor 113 performs the HARQ feedback processing for the data transmitted through the uplink.

The retransmission processor 113 determines the collision with other user equipment upon the final determination and retransmission of the HARQ RTT value and processes the collision if it is determined whether the collision occurs. If it is predicted that the collision with other user equipment occurs upon the retransmission, the retransmission processor 113 informs a scheduler that there is a need to transmit new resource allocation information by an adaptive scheme. Further, in connection with this, it is informed that the ACK instead of the NACK may be transmitted to the HARQ feedback processor 113. Further, the retransmission processor 113 receives the ACK for the resource allocation information transmitted from the user equipment and finally determines the HARQ RTT based on the received ACK.

Further, when the HARQ error including the reception error of the resource allocation information occurs, the retransmission processor 113 requests the allocation information transmission processor 111 to retransmit the resource allocation information.

For this purpose, the retransmission processor 113 may perform the energy detection at the predicted transmission timing of the user equipment and may determine whether the error occurs based on the detected energy.

When the error occurs, the retransmission processor 113 requests the allocation information transmission processor 111 to retransmit the resource allocation information.

When the HARQ error continuously occurs, the retransmission processor 113 informs the scheduler that there is a need to adjust the HARQ RTT value.

The memory 120 is connected to the processor 110 and stores various information associated with an operation of the processor 110. The RF converter 130 is connected to the processor 110 to transmit and receive a radio signal. The RF converter 130 transmits a signal transmitted from the processor 110.

Figure 17:
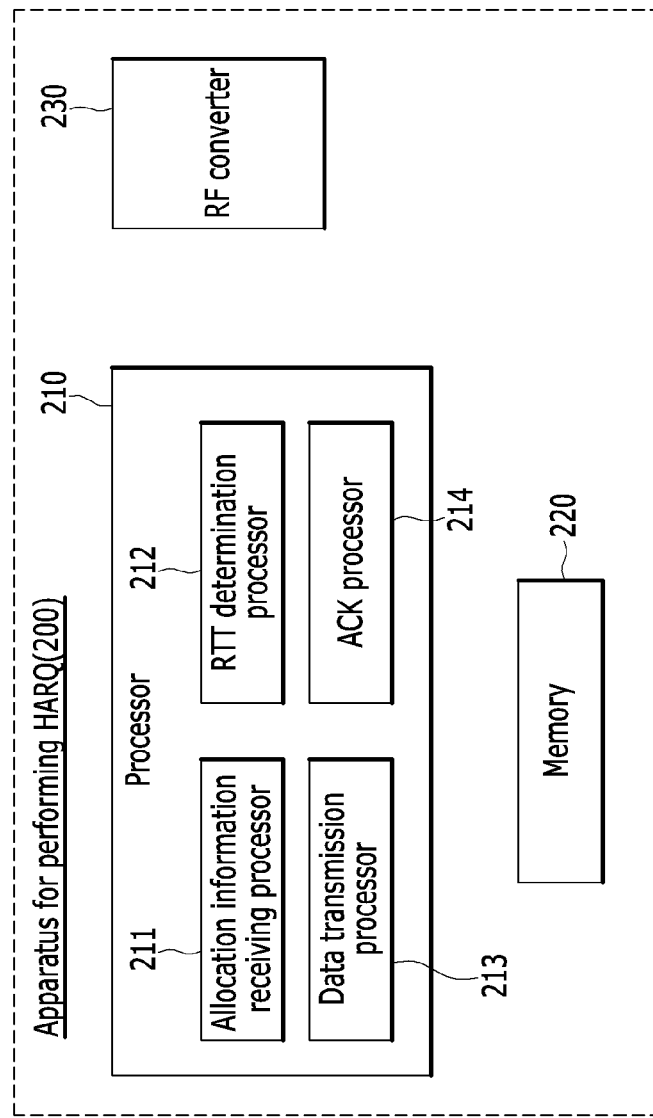
FIG. 17 is a configuration diagram of an apparatus for performing HARQ of user equipment according to an exemplary embodiment of the present invention.

FIG. 17 is a configuration diagram of an apparatus for performing HARQ of user equipment according to an exemplary embodiment of the present invention.

As illustrated in FIG. 17, an apparatus 200 for performing an HARQ of the user equipment according to the exemplary embodiment of the present invention includes a processor 210, a memory 220, and a radio frequency (RF) converter 230. The processor 210 may be configured to implement the method described based on FIGS. 2 to 15. Here, the detailed description of a portion similar to the above method will be omitted.

For this purpose, the processor 210 includes an allocation information receiving processor 211, an RTT determination processor 212, a data transmission processor 213, and an ACK processor 214.

The allocation information receiving processor 211 receives the resource allocation information. In particular, if adding the duration field corresponding to the L-bit to the resource allocation information from the base station is set by the signaling in the upper layer, the duration field of the resource allocation information is confirmed and the value of the confirmed duration field is transmitted to the RTT determination processor 212.

The RTT determination processor 212 determines the HARQ RTT of the synchronous HARQ operation. The RTT determination processor 212 calculates a new HARQ RTT depending on the value included in the duration field. The new HARQ RTT is compared with the RTT of the HARQ process currently in operation to determine a larger value as the HARQ RTT of the synchronous HARQ operation. The RTT determination processor 212 may the value of the HARQ RTT of the synchronous HARQ operation as the default value after all the HARQ processes are completed.

The data transmission processor 213 transmits data, in particular, performs the synchronous HARQ operation based on the HARQ feedback from the base station.

When the HARQ RTT of the synchronous HARQ operation is changed according to the resource allocation information, the ACK processor 214 transmits the ACK for the resource allocation information. The ACK processor 214 may transmit the ACK for the resource allocation information at the HARQ ACK/NACK transmission timing for the data transmission of the first TTI in the case of the downlink or at the data transmission timing of the first TTI of the TTI duration allocated for the data transmission in the case of the uplink.

The memory 220 is connected to the processor 210 and stores various information associated with an operation of the processor 210. The memory 220 may be positioned inside or outside the processor and the memory may be connected to the processor through already known various means.

The RF converter 230 is connected to the processor 210 to transmit and receive a radio signal. The RF converter 230 transmits a signal transmitted from the processor 210.

The memories 120 and 220 may be positioned inside or outside the processor and the memory may be connected to the processor through already known various means. The memory is various types of volatile or non-volatile storage media. For example, the memory may include a read-only memory (ROM) or a random access memory (RAM).

According to the exemplary embodiment of the present invention, it is possible to process the synchronous HARQ operation based on the same number of HARQ processes and retransmission number without the additional control information if the allocation of the plurality of TTIs, which length of TTI is shorter than conventional TTI for short transmission delay in the wireless communication system.

The exemplary embodiments of the present invention are not implemented only by the apparatus and/or method as described above, but may be implemented by programs realizing the functions corresponding to the configuration of the exemplary embodiments of the present invention or a recording medium recorded with the programs, which may be readily implemented by a person having ordinary skill in the art to which the present invention pertains from the description of the foregoing exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for performing a synchronous hybrid automatic repeat reQuest (HARQ), comprising:
    allocating a length of a transmission time interval (TTI) with variable size per HARQ process;
    transmitting resource allocation information including a duration field corresponding to a length of a TTI allocated to each of the HARQ processes;
    determining whether an HARQ error occurs at predetermined timing after the resource allocation information is transmitted; and
    when the HARQ error occurs, handling the HARQ error, wherein a new HARQ round trip time (RTT) for retransmission in a terminal is determined according to the length of the TTI corresponding to the duration field and then a transmission timing for next retransmission is determined according to the new HARQ RTT.

2. A method for performing a synchronous hybrid automatic repeat reQuest (HARQ), comprising:
when a variable transmission time allocation is allocated per HARQ process, transmitting resource allocation information including a duration field corresponding to a length of a transmission time interval (TTI) allocated to each of the HARQ processes;
determining whether an HARQ error occurs at predetermined timing after the resource allocation information is transmitted; and
when the HARQ error occurs, handling the HARQ error, wherein
the determining whether the HARQ error occurs includes:
performing energy detection at a first receiving timing of an HARQ process newly allocated to user equipment; and
when the energy is not detected, determining that an HARQ error occurs.

3. The method of claim 2, wherein:
the handling of the HARQ error includes:
retransmitting the resource allocation information.

4. The method of claim 3, wherein:
the handling of the HARQ error further includes:
even after the resource allocation information is retransmitted, if the HARQ error caused by reception error of the resource allocation information occurs, performing readjusting of the HARQ RTT of the base station.

5. The method of claim 4, wherein:
in the performing of the readjusting,
the value of the HARQ RTT of the base station is adjusted depending on a current HARQ RTT value during an operation of the user equipment.

6. The method of claim 1, wherein:
the determining whether the HARQ error occurs includes:
predicting, by a plurality of user equipment, whether the HARQ error caused by retransmission by a plurality of user equipment through same uplink resources occurs, and
the handling of the HARQ error includes:
if it is predicted that the HARQ error occurs after previous transmission of user equipment, sending an positive acknowledgement (ACK) as HARQ feedback indicating a success of receiving data to prevent the user equipment from retransmission.

7. The method of claim 6, wherein
the handling of the HARQ error further includes:
sending the positive ACK as HARQ feedback and then re-allocating resources and transmitting information related to the re-allocated resource.

8. A method for performing, by user equipment, a hybrid automatic repeat reQuest (HARQ), comprising:
receiving resource allocation information from a base station;
determining an HARQ round trip time (RTT) for retransmission of a synchronous HARQ operation according to a duration field included in the resource allocation information, wherein the duration field indicates a length of a transmission time interval (TTI) allocated to an HARQ process and a length of a TTI per HARQ process is variable; and
when the HARQ RTT is changed, transmitting a positive acknowledgment (ACK) for the resource allocation information to the base station,
wherein a transmission timing for next retransmission is determined according to the determined HARQ RTT.

9. The method of claim 8, wherein
the transmitting of the positive ACK to the base station includes:
when data are received during multiple TTIs allocated to the user equipment, transmitting a positive ACK for downlink resource allocation information to the base station at a HARQ feedback (ACK/NACK (negative ACK)) transmission timing for first transmission among the allocated multiple TTIs.

10. A method for performing, by user equipment, a hybrid automatic repeat reQuest (HARQ), comprising:
receiving resource allocation information from a base station and changing an HARQ RTT of a synchronous HARQ operation according to a duration field included in the resource allocation information, the duration field indicating a length of a transmission time interval (TTI) allocated to the HARQ process; and
when the HARQ RTT is changed, transmitting a positive acknowledgment (ACK) for the resource allocation information to the base station,
wherein
the transmitting of the positive ACK to the base station includes:
transmitting the positive ACK for uplink resource allocation information to the base station at first data transmission TTI among the multiple TTIs allocated to the user equipment.

11. The method of claim 10, wherein
an uplink control channel using for transmitting an ACK for the resource allocation information is multiplexed with an uplink data channel.

12. The method of claim 8, wherein:
the determining of an HARQ RTT for retransmission of a synchronous HARQ operation includes:
calculating a new HARQ RTT depending on a value of the duration field; and
if a value of the new HARQ RTT is larger than a currently operating value of HARQ RTT, changing an HARQ RTT for next retransmission of the synchronous HARQ operation.

13. The method of claim 12, further comprising:
after operations of all user equipment's HARQ processes are ended, changing the HARQ RTT of the synchronous HARQ operation to a predetermined default value.

14. An apparatus for performing a synchronous hybrid automatic repeat reQuest (HARQ), comprising:
a radio frequency converter transmitting/receiving a signal through an antenna; and
a processor connected to the radio frequency converter and performing the HARQ,
wherein the processor includes:
allocating a length of a transmission time interval (TTI) with variable size per HARQ process, transmitting resource allocation information including a duration field corresponding to a length of a transmission time interval (TTI) allocated to each of the HARQ processes; and
after the resource allocation information is transmitted, a retransmission processor determining whether the HARQ error occurs at a predetermined timing and when the HARQ error occurs, handling the HARQ error,
wherein a new HARQ round trip time (RTT) for retransmission in a terminal is determined according to the length of the TTI corresponding to the duration field and then a transmission timing for next retransmission is determined according to the new HARQ RTT.

15. The apparatus of claim 14, wherein:
when the energy is not detected at a first receiving timing of the user equipment's newly allocated HARQ process, the retransmission processor determines that the HARQ error caused by reception error of the resource allocation information occurs and requests the allocation information transmitting processor to retransmit the resource allocation information.

16. The apparatus of claim 15, wherein:
even after the resource allocation information is retransmitted, if the HARQ error caused by reception error of the resource allocation information occurs, the retransmission processor performs readjusting of the HARQ RTT of the base station.

17. The apparatus of claim 14, wherein:
the processor further includes
an HARQ feedback processor transmitting HARQ feedback for data transmitted through the uplink, and
the retransmission processor
requests the HARQ feedback processor to send a positive acknowledgment (ACK) representing a success of receiving the data to the user equipment despite a receiving failure of receiving the data transmitted from the user equipment so that the user terminal does not retransmit data, if it is predicted that the HARQ error caused by retransmission by a plurality of the user equipment though same uplink resources occurs.

18. An apparatus for performing, by user equipment, a hybrid automatic repeat reQuest (HARQ), comprising:
a radio frequency converter transmitting/receiving a signal through an antenna; and
a processor connected to the radio frequency converter and performing the HARQ,
wherein the processor includes:
an allocation information receiving processor receiving resource allocation information from a base station;
an RTT determination processor determining an HARQ round trip time (RTT) for retransmission of a synchronous HARQ operation according to a duration field included in the resource allocation information, wherein the duration field indicates a length of a transmission time interval (TTI) allocated to an HARQ process and a length of a TTI per HARQ process is variable; and
when the HARQ RTT is changed, an ACK processor transmitting an ACK for the resource allocation information to the base station,
wherein a transmission timing for next retransmission is determined according to the determined HARQ RTT.

19. The apparatus of claim 18, wherein:
the ACK processor uses one of
a method for transmitting an ACK for the resource allocation information to the base station at an HARQ feedback (ACK / NACK (negative ACK)) transmission timing for data reception of first transmission among allocated multiple TTIs and
a method for transmitting the ACK for the resource allocation information to the base station at a first data transmission TTI among multiple TTIs allocated for the data transmission.

20. The apparatus of claim 18, wherein:
the RTT determination processor changes an HARQ RTT for next retransmission of the synchronous HARQ operation when a value of the HARQ RTT newly calculated depending on the value included in the duration field is larger than the HARQ RTT value of the currently operating HARQ process.

* * * * *